United States Patent
Sharman

Patent Number: 5,829,831
Date of Patent: Nov. 3, 1998

[54] REAR SEAT ASSEMBLY FOR A MOTOR VEHICLE

[75] Inventor: Paul Sharman, Coventry, England

[73] Assignee: Rover Group Limited, Warwick, England

[21] Appl. No.: 849,757

[22] PCT Filed: Feb. 1, 1996

[86] PCT No.: PCT/GB96/00214

§ 371 Date: Jun. 19, 1997

§ 102(e) Date: Jun. 19, 1997

[87] PCT Pub. No.: WO96/26089

PCT Pub. Date: Aug. 29, 1996

[30] Foreign Application Priority Data

Feb. 24, 1995 [GB] United Kingdom .................. 9503739

[51] Int. Cl.$^6$ ............................ B60N 2/02; A47C 7/02; B60R 21/00
[52] U.S. Cl. ................ 297/378.12; 297/452.2; 297/475; 297/483
[58] Field of Search ...................... 297/378.1, 475, 297/483, 474, 473, 452.2, 452.18, 232, 378.12, 248; 452/63, 64, 65.1; 40/320; 296/63, 64, 65.1

[56] References Cited

U.S. PATENT DOCUMENTS

| | | |
|---|---|---|
| 3,761,127 | 9/1973 | Giese et al. . |
| 4,218,074 | 8/1980 | Crawford . |
| 5,022,677 | 6/1991 | Barbiero . |
| 5,253,924 | 10/1993 | Glance . |
| 5,286,084 | 2/1994 | Bart . |
| 5,289,986 | 3/1994 | Hoshihara . |
| 5,441,332 | 8/1995 | Verellen . |

FOREIGN PATENT DOCUMENTS

| | | |
|---|---|---|
| 29 24 144 | 1/1981 | Germany . |
| 2927159 | 2/1981 | Germany . |
| 94 02 767 | 4/1994 | Germany . |
| 2235124 | 2/1991 | United Kingdom . |
| 2279863 | 1/1995 | United Kingdom . |

Primary Examiner—Milton Nelson, Jr.
Attorney, Agent, or Firm—Davis and Bujold

[57] ABSTRACT

A split rear seat assembly is disclosed in which the upper fixing of a three point automatic safety belt assembly for a center seated passenger is mounted in such a manner that it is accessible from the rear side of a backrest forming part of the seat assembly. The seat belt assembly can therefore be easily fitted to the backrest even after the backrest has been trimmed. The seat backrest has a strong internal reinforcing frame so that loads from the seat belt assembly upper fixing can be safely resisted.

36 Claims, 5 Drawing Sheets

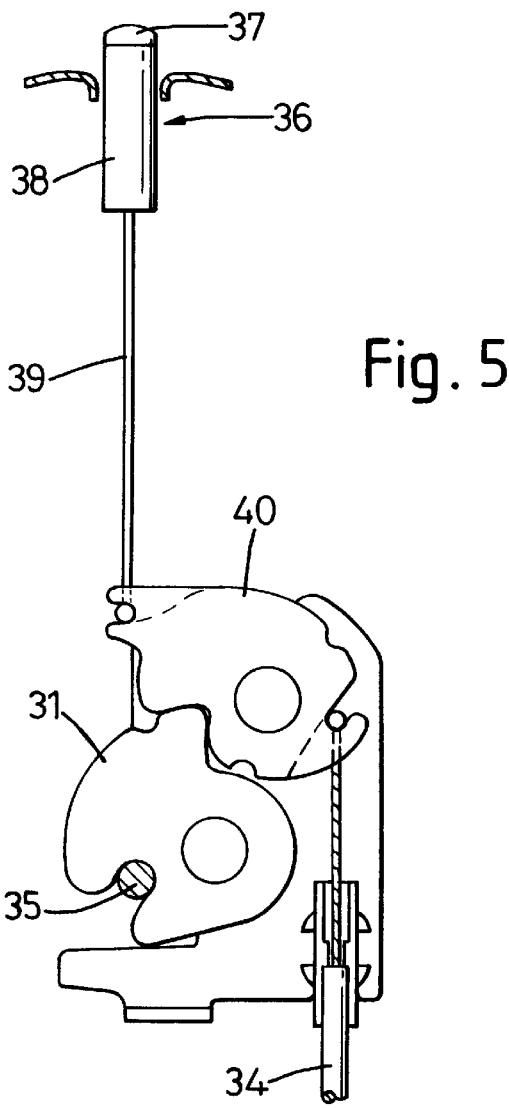
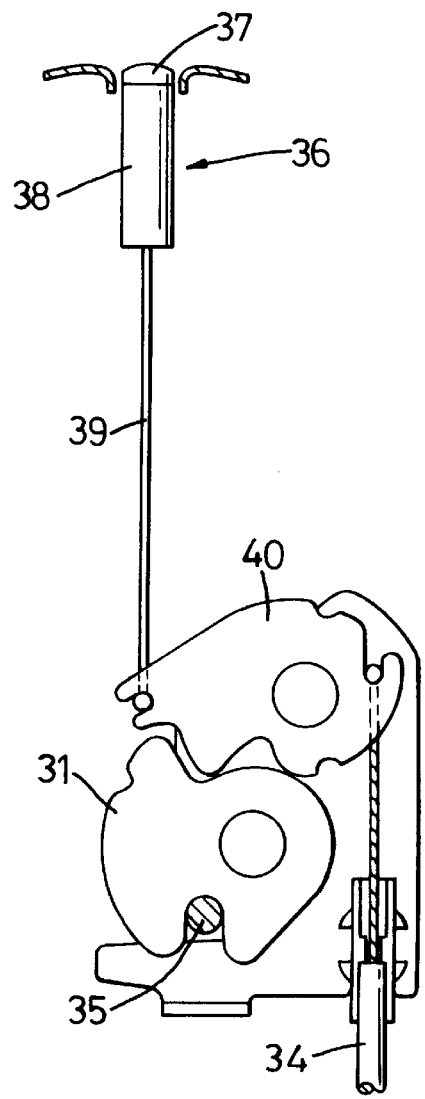
Fig. 5
Fig. 6

REAR SEAT ASSEMBLY FOR A MOTOR VEHICLE

This invention relates to motor vehicles and in particular to a rear seat assembly for a motor vehicle that includes a three point safety belt passenger restraint for a centre seated passenger.

It is well known to provide a single lap strap restraint for the centre rear passenger of a motor vehicle but such a restraint although preventing the passenger from being thrown forward off of the seat in the event of a frontal collision does not restrain the upper torso of the passenger. Therefore in a severe frontal collision a passenger restrained solely by a lap strap is likely to pivot forward which may cause contact between the upper torso or head of a passenger with another part of the vehicle.

It is further known from DE-U- 9402767 to provide a rear seat assembly including a safety belt system for the centre rear passenger of a motor vehicle comprising a seat backrest portion pivotally connected near to its lower edge to part of the structure of the motor vehicle to allow the backrest portion to be folded from a substantially upright position to a substantially horizontal position and a three-point safety belt system having an automatic seat belt reel assembly connected to a reinforcing frame structure forming part of the seat backrest portion.

It is an object of this invention to provide a rear seat assembly for a motor vehicle including an improved attachment means for a three point passenger restraint to restrain the upper torso of a centre seated rear seat passenger.

According to the invention there is provided a rear seat assembly as described above with reference to DE-U-9402767 characterised in that said reel assembly is recessed into a rear face of said backrest portion and that the reel assembly and the fixing means used to connect the reel assembly to the reinforcing frame structure are both accessible from the rear face of said backrest portion.

The backrest portion may be is formed as two separate parts each of which is pivotable from a substantially upright position to a substantially horizontal position in which case said reel assembly may be recessed into a rear face of one of said separate parts of the backrest portion and is connected to a reinforcing frame structure forming part of that part of the seat backrest portion.

The reinforcing frame structure may include a peripheral tubular frame and a cross-brace member fixed between upper and lower portions of the peripheral frame.

The reinforcing frame structure may further include a top anchor structure of open box like construction fixed to said peripheral frame and said cross-brace member, the top anchor structure defining a recess into which said reel assembly is fitted and secured.

A belt guide means may be attached to an upper part of the tubular frame to guide the shoulder section of the first webbing strap from the reel assembly over the upper edge of the seat backrest portion.

Preferably, the pivot means of the back rest portion may be attached to part of the reinforcing frame structure of the backrest portion.

A seat latch mechanism may be fixed to one end of the seat backrest portion to lock it into a vertical position.

Preferably, an indicator means may be connected to the latch mechanism to show when the seat backrest portion is locked into a latched vertical position.

The indicator means may comprise a multicoloured knob attached to part of the latch mechanism by a rod.

FIG. 5 is a side view of a seat latching mechanism and indicator means in a first position; and FIG. 6 is a side view of a seat latching mechanism and indicator means in a second position.

With reference to the figures there is shown a rear seat assembly 10 including a safety belt system for the centre rear passenger of a motor vehicle.

The seat assembly comprises of a seat base portion 11 connected by bracket means to part of the floor structure of the motor vehicle and a seat backrest portion 12.

Figure 1:
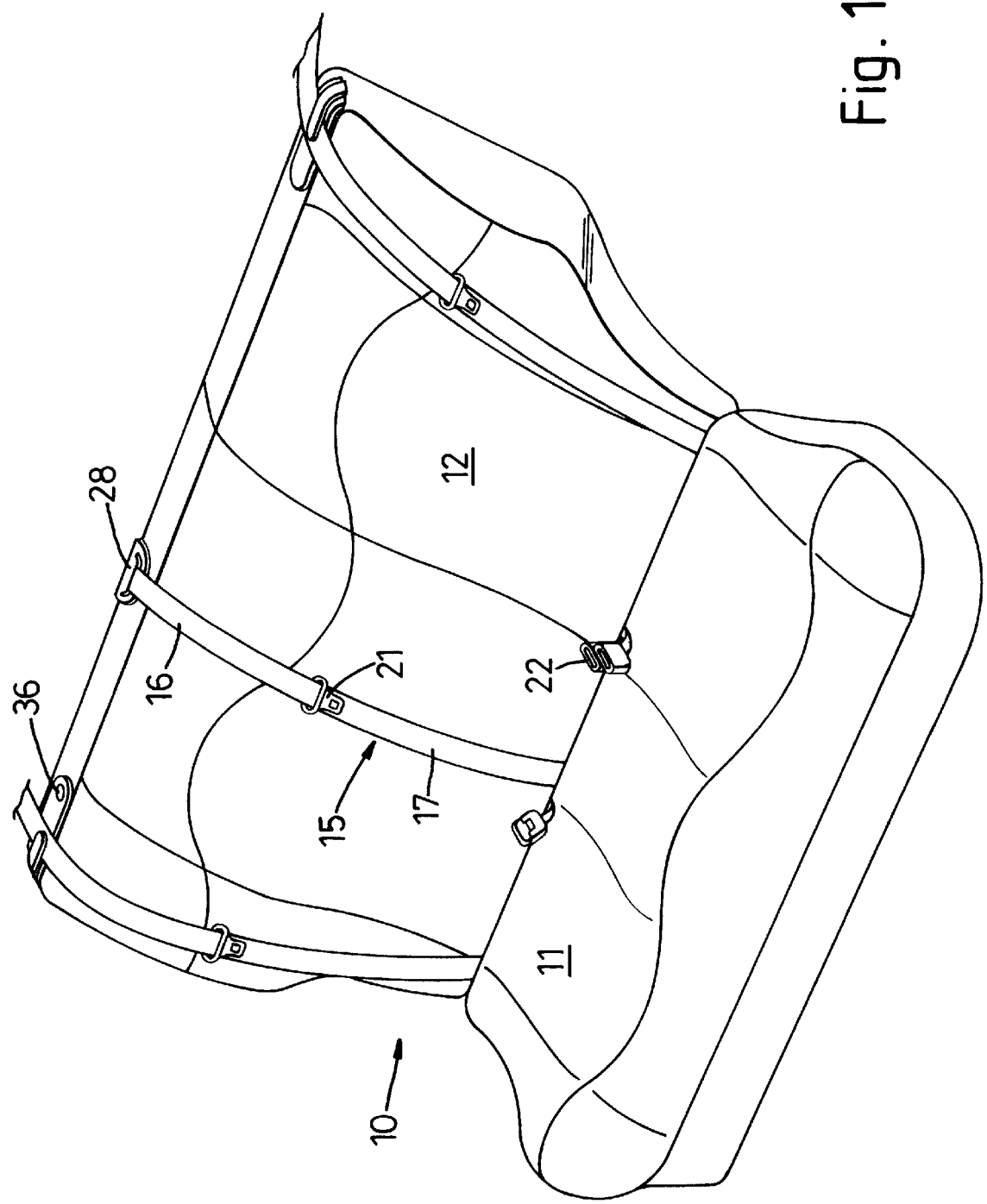
FIG. 1 is a pictorial representation of a fully trimmed rear seat assembly according to the invention.
Figure 2:
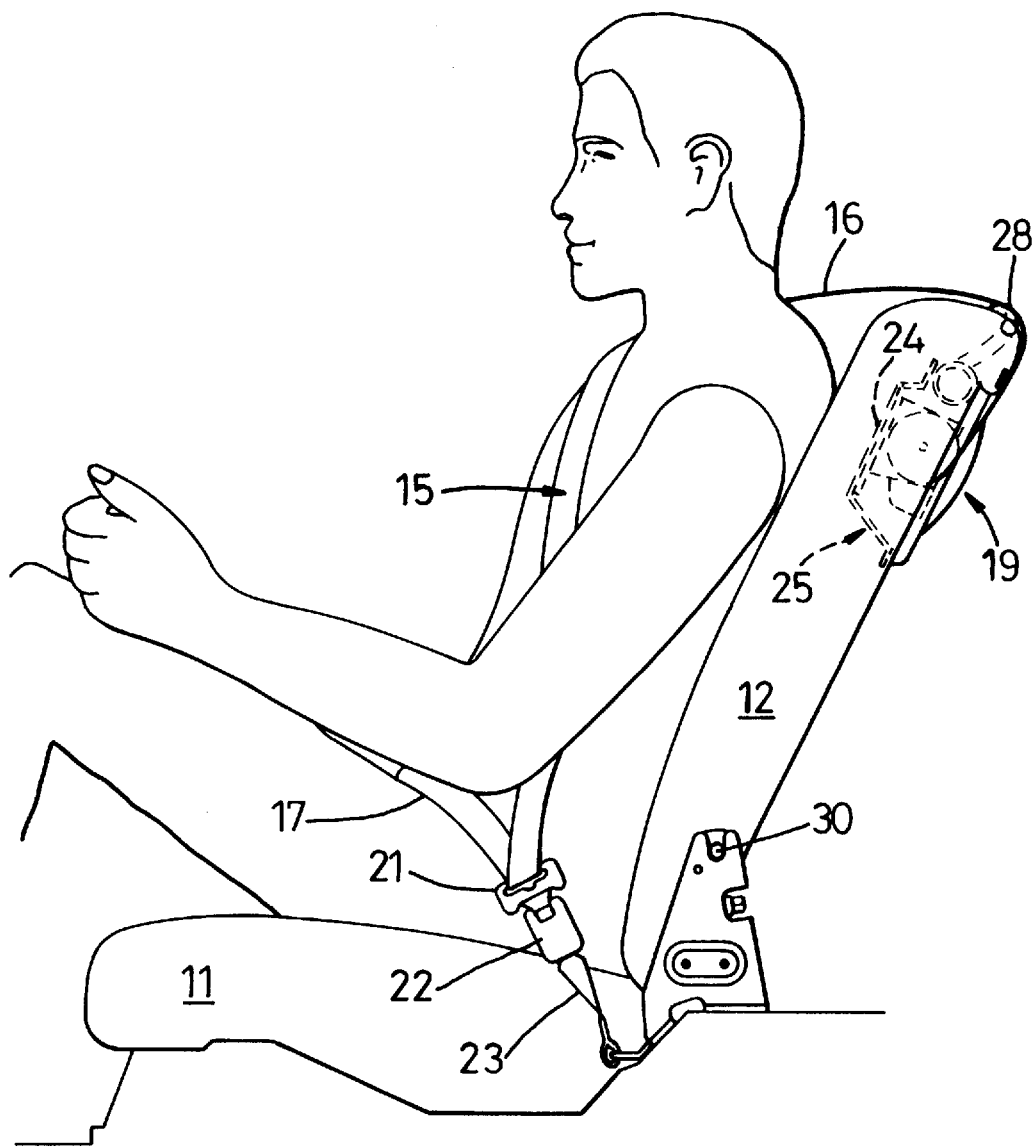
FIG. 2 is a side view of a right hand portion of a backrest according to the invention.
Figure 3:
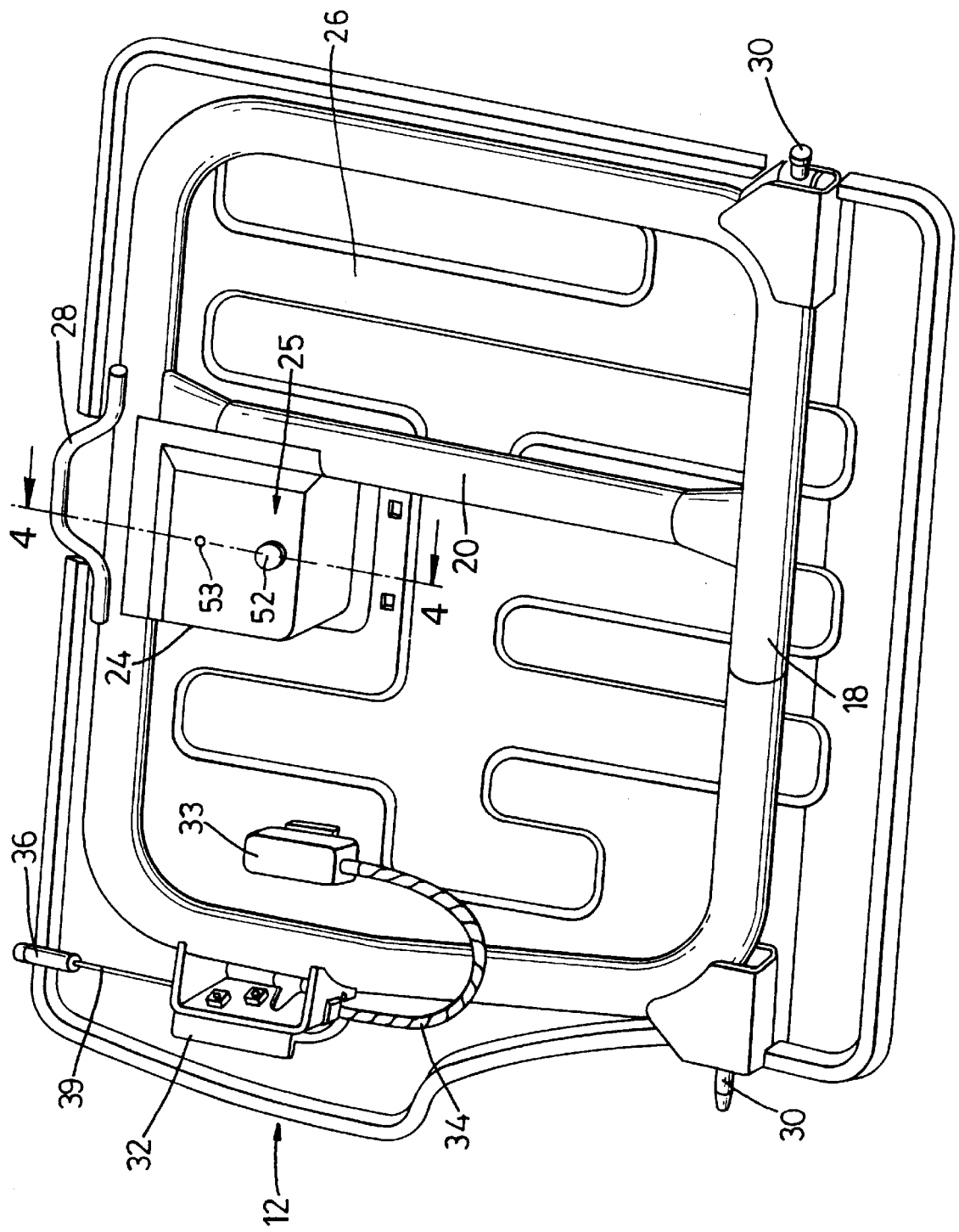
FIG. 3 is a pictorial representation of said right hand backrest in a pre-trimmed state.

The seat backrest portion 12 is formed as two separate parts each of which is pivotally connected near to its lower edge to part of the structure of the motor vehicle so that it can be folded from a substantially upright position as shown in FIGS. 1 and 2 to a substantially horizontal position (not shown) Such rear seats are often referred to as a split backrest seats and are commonly used in hatchback or estate type motor vehicles.

It is usual for the backrest to be split in the ratio of 60 to 40 or 70 to 30 so that when three people are occupying the rear seat two people share the larger part of the backrest and one person utilises the smaller part. It is therefore possible to fold down the smaller part of the backrest and still seat two passengers in the rear of the vehicle. This is a useful facility to have if rear seat passengers and lengthy items have to be carried at the same time.

The safety belt system comprises of a first webbing strap 15 having shoulder and lap belt sections 16, 17 connected to the vehicle by top and bottom anchor means. A first coupling means 21 is threaded on and is in running engagement with the first webbing 15 and is adapted for engagement with a second coupling means 22 attached to part of the floor structure of the motor vehicle by means of a flexible connection in the form of a second webbing strap 23.

The first coupling means 21 is adapted at one end for releasable engagement with said second coupling means 22 and has an aperture at the other end with which the first webbing strap 15 is engaged.

The top anchor means is provided in the form of an automatic seat belt reel assembly 19 to which the shoulder portion 16 of the first webbing strap 15 is attached.

The seat belt reel assembly 19 has inertia locking means (not shown) associated therewith to lock the reel in the event of a collision.

The reel assembly 19 is directly attached to a reinforcing frame structure 25 formed within the larger part of the backrest portion 12 of the seat assembly.

The reinforcing frame structure 25 is formed by a steel peripheral tubular frame 18 to which is secured at upper and lower portions of the peripheral frame 18 a tubular steel cross brace member 20. The arrangement of the peripheral frame 18 and the cross brace 20 is such that when secured together they form an open framework which is relatively light and yet able to withstand the loading applied to that part of the backrest by the seat belt assembly 19.

A top anchor support structure 24 is attached to the peripheral frame 18 and the cross-brace 20 at a position towards the centre of the upper portion of the peripheral frame 18. The top anchor support structure 24 is of an open box like construction which defines a recess into which the seat belt reel assembly 19 is fixed from the rear side of the backrest 12.

A guide ring 28 is attached to the upper portion of the peripheral frame 18 to provide a guide for the shoulder portion 16 of the first webbing strap 15.

The guide ring 28 reduces the load applied by the inertia reel assembly 19 to the top anchor structure 24 in that, when the inertia reel assembly 19 is locked up and a high load has to be transferred from the shoulder portion 16 of the first webbing strap 15 into the reinforcing frame structure 25, some of the load is transferred from the guide ring 28 directly into the upper portion of the peripheral frame 18.

The front face of the reinforcing frame structure 25 is covered with a resilient foam material and is trimmed in an appropriate fabric material to provide a comfortable backrest for a passenger of the vehicle, a steel backplate 26 is attached to the frame member 18 to form a support for the resilient foam material and to further strengthen the structure.

A pivot pin 30 is attached to the peripheral frame member 18 at each side near to its lower edge to connect the backrest to the structure of the vehicle and provide a pivotal connection therebetween. By attaching the pivot pins 30 to the peripheral frame member 18 any loads applied to the pivot pins 30 are transferred directly into part of the reinforcing frame structure 25 of the backrest.

Figure 4:
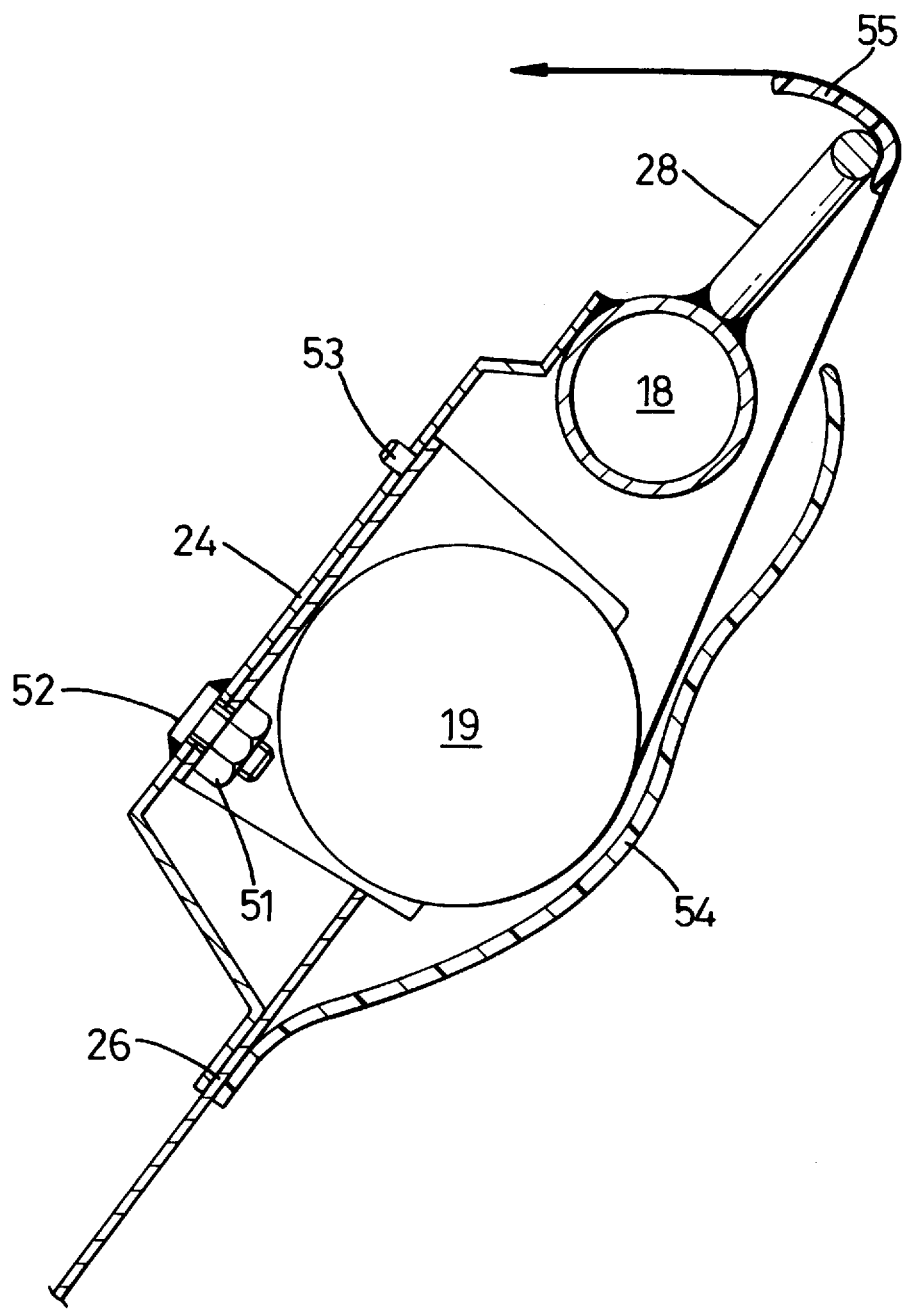
FIG. 4 is a cross-section on the line 4—4 on FIG. 3.

As can be seen in FIG. 4 the inertia reel assembly 19 is attached to the top anchor support structure by means of a nut 51 threadingly engaged with a stud 52 welded to the support structure 24. The top anchor support structure 24 is attached to the frame member 18, the cross-brace 20 and to the backrest backplate 26.

A pin 53 projects from the rear side of the inertia reel assembly 19 for engagement with a hole in the support structure 24. The pin 53 is used to correctly locate and align the inertia reel assembly 19 on the top anchor support 24.

The inertia reel assembly 19 is attached to the reinforcing structure 25 by inserting it into the top anchor support 24 from the rear of the backrest 12.

By attaching the inertia reel assembly 19 to the reinforcing frame 25 in a manner such that it is accessible from the rear side of the backrest 12 it is possible to trim and fully install the seat assembly 10 into a motor vehicle before installing the seat belt assembly. This enables the inertia reel belt assembly 19 to be easily installed within the vehicle or replaced should it become defective.

A plastic cover 54 is fitted to the rear side of the backrest 12 to cover the inertia reel assembly 19 when in use.

A plastic guide 55 is press fitted onto the upper portion of the guide ring 28. The guide 55 provides a relatively low friction guide for the shoulder portion 16 of the first webbing strap 15 on its passage over the top edge of the backrest portion 12 thereby reducing chafing of the webbing strap 15 of the seat assembly.

A seat latching mechanism is attached to each of the outer ends of the backrest member 12 to selectively secure the two parts in an upright position.

The seat latch mechanism used on the larger part of the backrest portion 12 comprises of a seat latch 32 connected to the tubular frame member 18, a release lever assembly 33 attached to part of the backrest such that a backrest release lever (not shown) is accessible from the rear side of the seat backrest 12 and a latch cable 34 linking the release lever to the seat latch 32.

The seat latch 32 has a rotatable latch plate 31 arranged, when the backrest 12 is in an upright position, to co-operate with a latch pin 35 secured to part of the body structure of the vehicle to selectively secure the backrest in said upright position.

To indicate whether the latch plate 31 of the seat latch 32 is locked in engagement with the latch pin 35 an indicator means is connected to a rotatable locking plate 40 forming part of the seat latch mechanism 32.

The indicator means comprises of an indicator button 36 engaged with an aperture in the top edge of the seat backrest 12. The top portion 37 of the indicator button 36 is of a similar colour to that of the backrest 12 surrounding the aperture but a lower portion 38 of the button 36 is brightly coloured such as red or orange.

When the button 36 is in a first position (as shown in FIG. 5) the lower portion 38 is clearly visible thereby indicating that the backrest 12 is not locked in the latched position but when the indicator button 36 is in a second position (as shown in FIG. 6) only the top portion 37 is visible and the indicator button 36 then blends in with the surrounding backrest 12.

The indicator button 36 is connected to the seat latch 32 by means of linkage rod 39 which is attached to the rotatable locking plate 40 which is rotatable by means of the latch cable 34.

When the backrest release lever is actuated the latch release cable 34 moves the locking plate 40 into the position shown in FIG. 5. In this position the latch plate 31 is able to become detached from the latch pin 35 if the backrest 12 is pushed forward. When the backrest release lever is released the locking plate 40 is urged by a spring (not shown) into the position shown in FIG. 6 thereby locking the latch plate 31 in engagement with the latch pin 35. It will be appreciated that the indicator button 36 can only move into the retracted position when the latch plate 31 has been locked into the latched position.

It is important that an indication of backrest 12 latching state is provided because the seat belt reel assembly 19 is attached directly to the reinforcing frame 25 of the backrest 12.

Although the reinforcing frame structure has been described as a steel frame structure it will be appreciated that it could be manufactured from other materials having sufficient strength and stiffness.

In addition the reference to centre seated is intended to mean a person seated away from the side of a vehicle and therefore if there are more than three seat positions across the vehicle centre seated would mean those passengers seated away from the side of the vehicle.

It will be appreciated that the bending moment applied to the peripheral frame 18 by the seat belt assembly 19 is considerably reduced by fixing the seat belt assembly to the peripheral frame 18 towards the centre of the upper portion of the frame 18 rather than at the end of the frame 18 that is towards the centre of the vehicle.

What is claimed is:

1. A rear seat assembly for a motor vehicle, the seat assembly comprising;

a seat base portion;

a backrest portion having a rear face, an upper edge and a lower edge;

a reinforcing frame structure forming part of said backrest portion;

a pivot means connected near to the lower edge of the backrest portion to permit said backrest portion to be folded from a substantially upright position to a substantially horizontal position;

a three-point safety belt system for a center rear passenger of a motor vehicle, the system including an automatic seat belt reel assembly for connection to said reinforcing frame, a first webbing strap having a shoulder section secured at one end to said seat belt reel assembly and a fixing means to secure the seat belt reel assembly to said reinforcing frame;

wherein said seat belt reel assembly is recessed into said rear face of said backrest portion such that the seat belt reel assembly and said fixing means for said seat belt reel assembly are both accessible from said rear face of said backrest portion.

2. An assembly as claimed in claim 1 wherein the reinforcing frame structure includes a peripheral tubular frame having upper and lower portions and a cross-brace member fixed between said upper and lower portions.

3. An assembly as claimed in claim 2 in which the pivot means are attached to said lower portion of said tubular frame.

4. An assembly as claimed in claim 2 in which a belt guide means is attached to said upper portion of the tubular frame to guide the shoulder section of the first webbing strap from said seat belt reel assembly over the upper edge of the seat backrest portion.

5. An assembly as claimed in claim 2 in which a top anchor structure of an open box like construction is fixed to said reinforcing frame structure, the top anchor structure defining a recess into which said reel assembly is fitted and secured.

6. An assembly as claimed in claim 5 in which a belt guide means is attached to an upper portion of the tubular frame to guide the shoulder section of the first webbing strap from the reel assembly over the upper edge of said seat backrest portion.

7. A rear seat assembly for a motor vehicle, the seat assembly comprising;

a seat base portion;

a backrest portion having a rear face, an upper edge and a lower edge;

a reinforcing frame structure forming part of said backrest portion;

a seat latch mechanism fixed to one end of the seat backrest portion to lock it into a vertical position;

a pivot means connected near to the lower edge of the backrest portion to permit said backrest portion to be folded from a substantially upright position to a substantially horizontal position;

a three-point safety belt system for a center rear passenger of a motor vehicle, the system including an automatic seat belt reel assembly for connection to said reinforcing frame, a first webbing strap having a shoulder section secured at one end to said seat belt reel assembly and a fixing means to secure the seat belt reel assembly to said reinforcing frame;

wherein said seat belt reel assembly is recessed into said rear face of said backrest portion such that the seat belt reel assembly and said fixing means for said seat belt reel assembly are both accessible from said rear face of said backrest portion.

8. An assembly as claimed in claim 7 in which an indicator means is connected to the latch mechanism to show when the seat backrest portion is locked into a latched vertical position.

9. An assembly as claimed in claim 8 in which the indicator means comprises a multicolored knob attached to part of the latch mechanism by a rod.

10. A rear seat assembly for a motor vehicle, the seat assembly comprising;

a seat base portion;

a backrest portion formed as two separate parts at least one of which has a rear face, an upper edge and a lower edge;

a reinforcing frame structure forming part of at least one of said separate parts of said backrest portion;

a pivot means connected near to the lower edge of the backrest portion to permit said backrest portion to be folded from a substantially upright position to a substantially horizontal position;

a three-point safety belt system for a center rear passenger of a motor vehicle, the system including an automatic seat belt reel assembly for connection to said reinforcing frame, a first webbing strap having a shoulder section secured at one end to said seat belt reel assembly and a fixing means to secure the seat belt reel assembly to said reinforcing frame;

wherein said seat belt reel assembly is recessed into said rear face of said backrest portion such that the seat belt reel assembly and said fixing means for said seat belt reel assembly are both accessible from said rear face of said backrest portion.

11. An assembly as claimed in claim 10 in which a top anchor structure of an open box like construction is fixed to said reinforcing frame structure, the top anchor structure defining a recess into which said reel assembly is fitted and secured.

12. An assembly as claimed in claim 10 in which the reinforcing frame structure includes a peripheral tubular frame and cross-brace member fixed between upper and lower portions of the peripheral frame.

13. An assembly as claimed in claim 12 in which the pivot means for the backrest portion are attached to said lower portion of said tubular frame.

14. An assembly as claimed in claim 12 in which a belt guide means is attached to said upper portion of the tubular frame to guide the shoulder section of the first webbing strap from said seat belt reel assembly over the upper edge of the seat backrest portion.

15. An assembly as claimed in claim 12 in which a top anchor structure of an open box like construction is fixed to said upper portion of said tubular frame structure, the top anchor structure defining a recess into which said reel assembly is fitted and secured.

16. An assembly as claimed in claim 15 in which the top anchor structure is also connected to said cross-brace member.

17. An assembly as claimed in claim 10 in which the backrest portion is split such that it has a larger part and a smaller part, the reinforcing frame structure being formed as part of the larger part.

18. An assembly as claimed in claim 17 in which the reinforcing frame structure includes a peripheral tubular frame and a cross-brace member fixed between upper and lower portions of the tubular frame.

19. An assembly as claimed in claim 18 in which the pivot means for the larger part are attached to said lower portion of said tubular frame.

20. An assembly as claimed in claim 18 in which a belt guide means is attached to an upper portion of the tubular frame to guide the shoulder section of the first webbing strap from the reel assembly over the upper edge of said seat backrest portion.

21. An assembly as claimed in claim 18 in which a top anchor structure of an open box like construction is fixed to said upper portion of said tubular frame structure, the top anchor structure defining a recess into which said reel assembly is fitted and secured.

22. An assembly as claimed in claim 21 in which the top anchor structure is also connected to said cross-brace member.

23. A rear seat assembly for a motor vehicle, the seat assembly comprising;

a seat base portion;

a backrest portion formed as two separate parts there being a larger part and a smaller part;

the larger part having a rear face, an upper edge and a lower edge and an internal reinforcing frame structure;

a seat latch mechanism fixed to one end of the larger part of the seat backrest portion to lock it into a vertical position;

a pivot means connected near to the lower edge of both of the backrest parts to permit said backrest parts to be folded from a substantially upright position to a substantially horizontal position;

a three-point safety belt system for a center rear passenger of a motor vehicle, the system including an automatic seat belt reel assembly for connection to said reinforcing frame, a first webbing strap having a shoulder section secured at one end to said seat belt reel assembly and a fixing means to secure the seat belt reel assembly to said reinforcing frame;

wherein said seat belt reel assembly is recessed into said rear face of said larger part such that the seat belt reel assembly and said fixing means for said seat belt reel assembly are both accessible from said rear face of said larger part of the backrest portion.

24. An assembly as claimed in claim 23 in which a top anchor structure of an open box like construction is fixed to said reinforcing frame structure, the top anchor structure defining a recess into which said reel assembly is fitted and secured.

25. An assembly as claimed in claim 23 in which an indicator means is connected to the latch mechanism to show when the seat backrest portion is locked into a latched vertical position.

26. An assembly as claimed in claim 25 in which the indicator means comprises a multicolored knob attached to part of the latch mechanism by a rod.

27. An assembly as claimed in claim 26 in which the reinforcing frame structure includes a peripheral tubular frame and a cross-brace member fixed between upper and lower portions of the tubular frame.

28. An assembly as claimed in claim 27 in which the pivot means for the larger part of said backrest portion are attached to said lower portion of said tubular frame.

29. An assembly as claimed in claim 27 in which a belt guide means is attached to said upper portion of the tubular frame to guide the shoulder section of the first webbing strap from said seat belt reel assembly over the upper edge of the larger part of said seat backrest portion.

30. An assembly as claimed in claim 27 in which a top anchor structure of an open box like construction is fixed to said upper portion of said tubular frame structure, the top anchor structure defining a recess into which said reel assembly is fitted and secured.

31. An assembly as claimed in claim 30 in which the top anchor structure is also connected to said cross-brace member.

32. An assembly as claimed in claim 23 in which the reinforcing frame structure includes a peripheral tubular frame and a cross-brace member fixed between upper and lower portions of the tubular frame.

33. An assembly as claimed in claim 32 in which the pivot means for the larger part of said backrest portion are attached to said lower portion of said tubular frame.

34. An assembly as claimed in claim 32 in which a belt guide means is attached to said upper portion of the tubular frame to guide the shoulder section of the first webbing strap from said seat belt reel assembly over the upper edge of the larger part of said seat backrest portion.

35. An assembly as claimed in claim 32 in which a top anchor structure of an open box like construction is fixed to said upper portion of said tubular frame structure, the top anchor structure defining a recess into which said reel assembly is fitted and secured.

36. An assembly as claimed in claim 35 in which the top anchor structure is also connected to said cross-brace member.

* * * * *